2 Sheets—Sheet 1.

E. BLANEY,

Assignor, by mesne assignments, to the SALEM MANUFACTURING COMPANY.

Machine for Shaping the Soles of Boots and Shoes.

No. 8,706. Reissued May 13, 1879.

Witnesses:

Wm. A. Perkins

F. B. Richardson

Inventor:

Elias Blaney

By Chas. W. Richardson his atty

2 Sheets—Sheet 2.

E. BLANEY,

Assignor, by mesne assignments, to the SALEM MANUFACTURING COMPANY.

Machine for Shaping the Soles of Boots and Shoes.

No. 8,706. Reissued May 13, 1879.

Witnesses:
Alex. A. Perkins
J. P. Richardson

Inventor:
Elias Blaney
By Chas. W. Richardson
his Atty.

UNITED STATES PATENT OFFICE.

ELIAS BLANEY, OF MARBLEHEAD, ASSIGNOR, BY MESNE ASSIGNMENTS, TO THE SALEM MANUFACTURING COMPANY, OF SALEM, MASSACHUSETTS.

IMPROVEMENT IN MACHINES FOR SHAPING THE SOLES OF BOOTS AND SHOES.

Specification forming part of Letters Patent No. 118,185, dated August 22, 1871; Reissue No. 8,706, dated May 13, 1879; application filed October 18, 1878.

*To all whom it may concern:*

Be it known that I, ELIAS BLANEY, of Marblehead, in the county of Essex and State of Massachusetts, have invented certain Improvements in Machines for Shaping the Soles of Shoes, of which the following is a specification, amended from Letters Patent No. 118,185, dated August 22, 1871.

My invention has for its object the shaping of shoe-soles after they are pegged or sewed, and is designed to supersede the necessity of shaping by the hammer. It belongs to that class of machines in which a die or former is depressed by a screw upon the sole, which is placed upon an iron last arranged beneath the former, sufficient pressure being given to form the sole into proper shape; and my invention consists, first, of an arrangement of devices by which the last carrying the shoe is reciprocated alternately under the former to be pressed and out toward the front of the machine for changing the shoes, and combining with this movement an automatic method of raising and depressing the screw, the two movements corresponding with each other, so that the machine may be operated by power rotating continuously in one direction; second, the alternate and reciprocal movement of the iron last carrying the shoe, by means of guides, under the former to be pressed and out toward the front of the machine, which movement may be simply by the hand or by mechanical device, independent of the said automatic movement.

Figure 1:
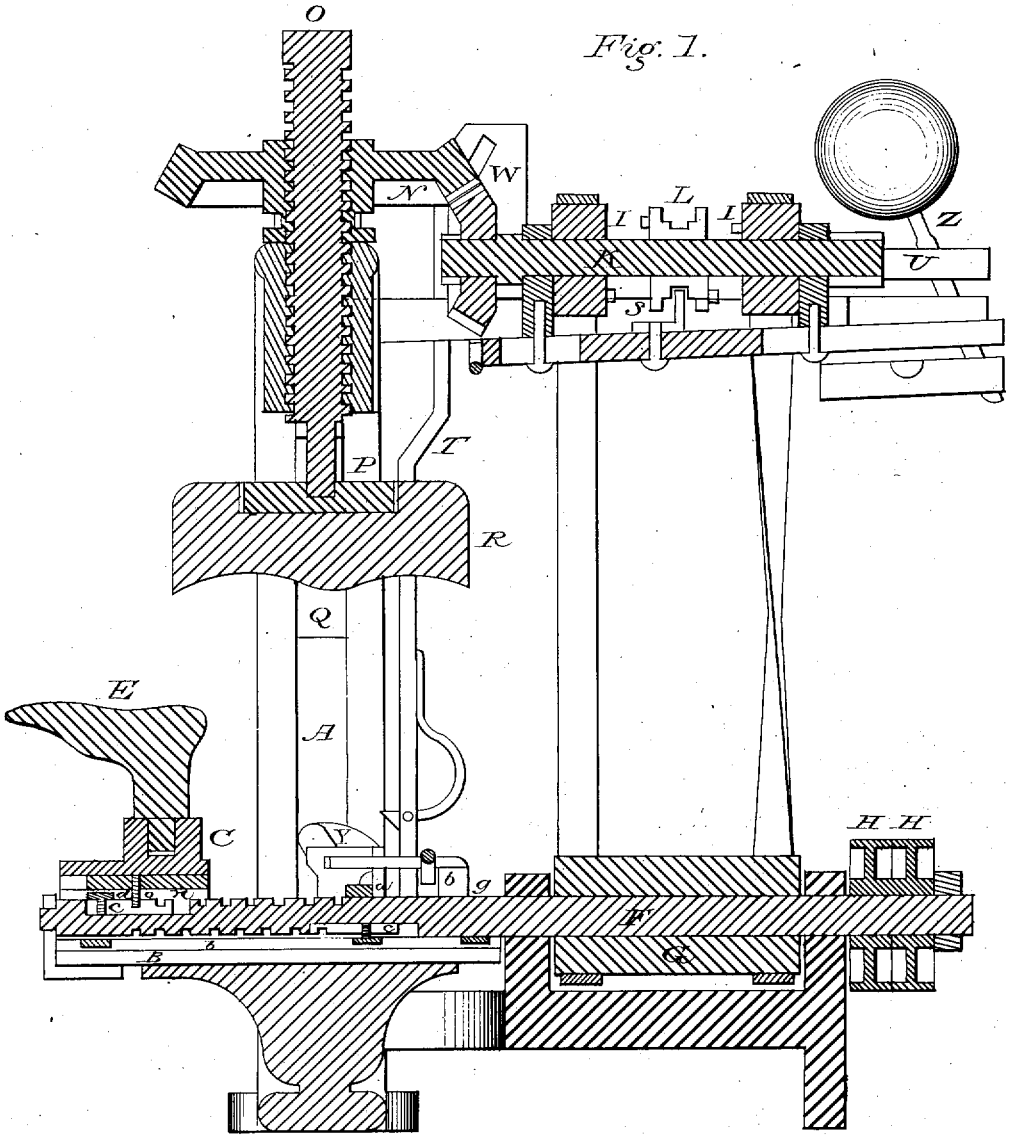
Figure 2:
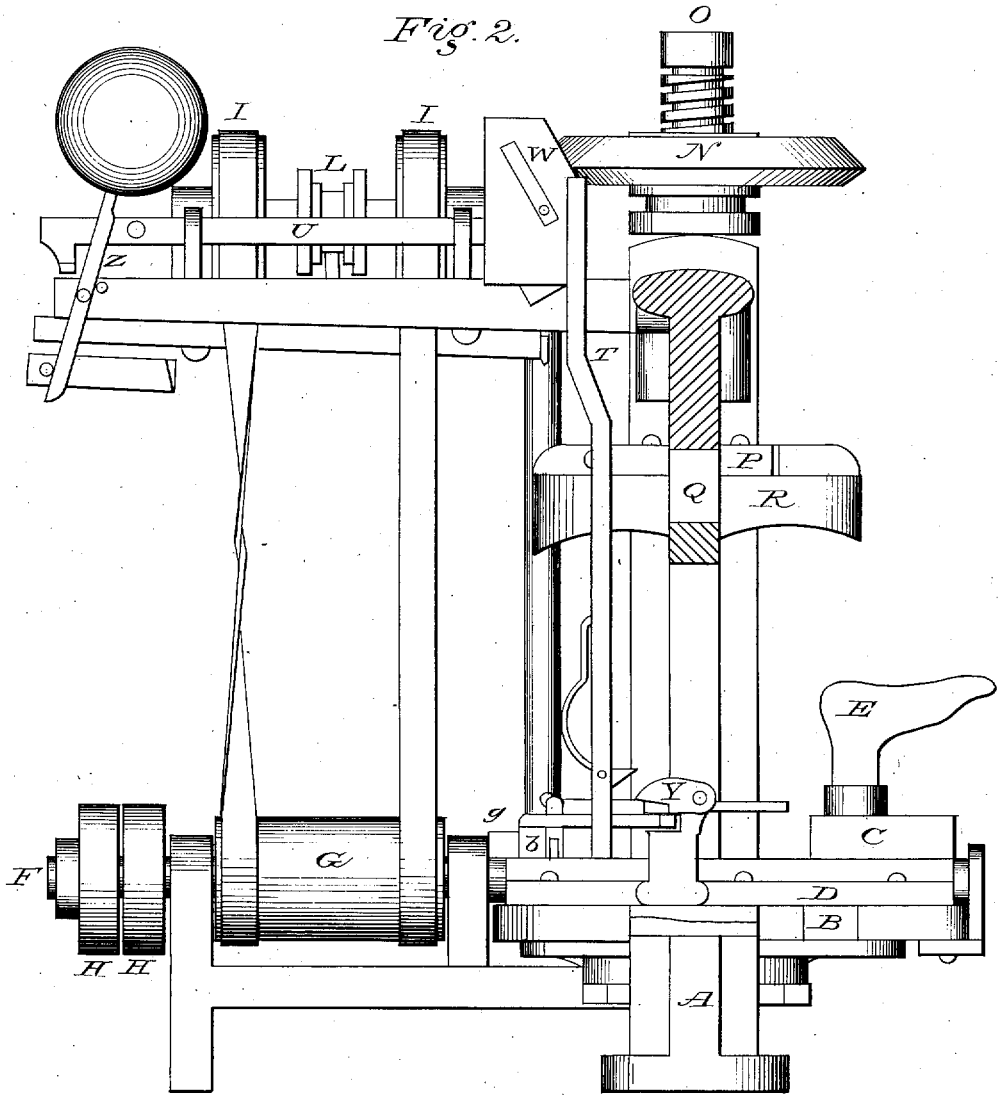

The drawings represent, in Figure 1, a sectional elevation of my machine. Fig. 2 is a sectional elevation, showing the shipping apparatus.

Similar letters of reference indicate like parts in all the figures.

The frame of the machine A is substantially made of cast-iron. B is the platen or bed upon which the sliding socket C traverses between the guides D. The last E is fitted into the socket C. The sliding socket C is reciprocated by means of the screw-shaft F, having a right and left hand screw-thread cut on the same portion of the shaft. At each end of the termination of the screw-threads on the shaft F two movable collars, *a a*, are placed, to which is attached a sliding piece, *c*, having guide-slots in one end, so arranged that the traversing fork *o* will be guided in a straight groove around the shaft when the sliding socket is required to be stationary, and guiding the fork into the right and left hand threads, to move the socket out or in.

The collars *a a* fit in a groove in the sliding guide *b*. By moving this sliding guide, the collars, with their pieces *c*, are moved to their proper position to form the straight groove around the shaft or turn the fork into the thread of the screw. The sliding guide *b* is moved by the operator to start the machine and automatically by a spring, *g*, after the shoe is pressed. The traversing fork *o* is fitted into a movable piece, *n*, which is held by a set-screw, allowing the sliding socket to be moved out or in, so that the different-sized shoes may fit under the former.

On the shaft F is placed the drum G and driving-pulleys H H. Motion is communicated by belts from the drum G to the clutch-pulleys I I on the shaft K. One of the clutch-pulleys is driven by an open belt, and the other by a cross-belt.

A clutch, L is fitted on the shaft K, and, as it is connected with either of the pulleys I I, the shaft K is revolved in opposite directions. A bevel-gear, M, is placed on the shaft K and drives a bevel-gear, N, which is placed on the screw O, which it turns by means of a sliding key in a spline in the screw O, the gear being held in place by a clasp fitted into a groove in the hub. At the lower end of the screw O the follower P is fastened, which is moved up or down by the screw O, and guided by the ways Q.

A former, R, is placed on the follower P, and is depressed upon the shoe with sufficient power to shape the sole by means of the screw O.

The surface of the former may be nickel-plated, to prevent the oxidation of the iron and soiling the leather.

The clutch L is made to connect either pulley I I by means of a sliding fork, S, which is operated by the attendant, by a lever, to engage with the pulley driven by the cross-belt. This gives a rotary motion to the shaft and bevel-gear, which turns the screw to depress the follower and former. The arm T is fastened to the follower, and as it is depressed a slide, U, is forced outward by means of a pin working in the inclined slot W and striking against a weighted lever, Z, moving it just beyond its center of gravity, so that it falls over, and its lower end, striking on a pin in the slide U, throws the clutch into the pulley driven by the straight belt just as the requisite pressure is given to the sole, thereby reversing the screw and raising the follower.

The arm T extends from the follower through the platen, by which it is guided, and carries a movable catch, which, as it rises, trips the latch-catch Y, which holds the sliding guide in place, throwing the fork *o* into the screw-thread and moving the shoe out to the front of the machine. As the screw O raises the arm T the inclined slot W moves back the slide U. A pin on this slide strikes the weighted lever Z, carrying it just beyond its center of gravity, so that it falls over, and its lower end, striking on a pin in the slide U, moves the clutch between the pulleys I I, stopping the rotation of the shaft K while another shoe is being placed on the last. The hand-lever is then moved by the operator, which throws the clutch L into the pulley driven by the cross-belt. At the same time it moves the slide U to throw the fork *o* into the screw on the screw-shaft F.

The screw on the screw-shaft F may be dispensed with, and the sliding socket moved by hand or by mechanical device independent of the automatic movement.

I claim as my invention—

1. The combination of the screw-shaft F with the clutch L and pulleys I I, in connection with the screw O and follower P, operating in the manner substantially as and for the purpose specified.

2. In a machine for shaping the soles of boots and shoes, the socket C, sliding piece *c*, traversing fork *o*, and screw-shaft, in combination, whereby the socket is reciprocated, as set forth.

3. In a machine for shaping boot and shoe soles, the combination of the sliding socket C and movable piece *n*, whereby the socket is made adjustable, all as set forth.

4. In a machine for shaping the soles of shoes, the combination of the last E with the guide D, so that the last may be reciprocated either by the hand or by mechanical device, alternately, under the former and out toward the front of the machine, all as set forth.

ELIAS BLANEY.

Witnesses:
WM. A. PERKINS,
CHAS. W. RICHARDSON.